May 27, 1969  F. G. FREEMAN  3,446,472
ELECTRICALLY OPERATED FLUID FLOW CONTROL DEVICES
Filed July 18, 1966

United States Patent Office 3,446,472
Patented May 27, 1969

3,446,472
ELECTRICALLY OPERATED FLUID FLOW
CONTROL DEVICES
Frank George Freeman, Solihull, England, assignor to
Joseph Lucas (Industries) Limited, Birmingham,
England
Filed July 18, 1966, Ser. No. 565,873
Int. Cl. F16k 1/20, 31/04
U.S. Cl. 251—65       2 Claims

ABSTRACT OF THE DISCLOSURE

An electrically operated fluid flow control device comprises a body, a deflectable arm connected at one end within the body, and carrying means to interrupt a stream of fluid flowing towards an outlet in the body, an electro magnetic device for moving the deflectable member in one direction and a pair of permanent magnets on the member and on the body respectively, having like poles adjacent to oppose the action of the electro magnetic device.

---

This invention relates to fluid flow control devices whereby the control of flow of fluid takes place in response to the actuation of an electro-magnetic device.

It is a well known fact that in electro-magnetic devices of the kind having a coil through which current is passed to set up a magnetic field between a core and a movable armature, the magnetic force exerted on the armature varies inversely as the square of the distance between the armature and the core of the electro-magnetic device. When applied to flow control devices, the flow control response to electrical current supplied is in substantially the same proportion.

It is the object of this invention to provide a flow control device in which flow control response is modified in a convenient manner.

In accordance with the present invention an electrically operated fluid flow control device comprises a body, a deflectable member mounted at one end in the body and being arranged at its other end to control the flow of fluid to an orifice in the body, an electro-magnetic device having an armature on or engageable with the deflectable member to move it in one direction upon energisation of the electro-magnetic device, and a pair of permanent magnets on the member and on the body respectively, having like poles adjacent to one another so as to oppose the action of the electro-magnetic device.

Figure 1:
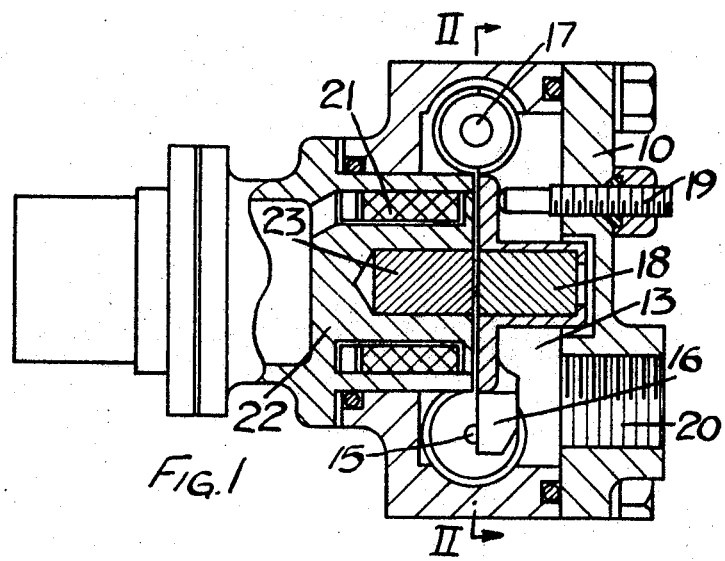
Figure 2:
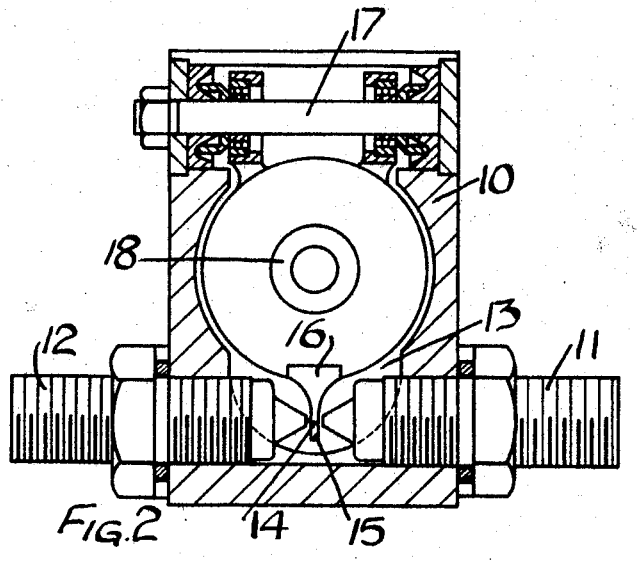

A specific example of the invention will now be described with reference to the accompanying drawings in which:

FIGURE 1 is a cross-sectional view of one form of the device constructed in accordance with this invention, and FIGURE 2 is a cross-sectional view on the line 11—11 in FIGURE 1.

In this example there is provided a device for controlling the flow of fluid through a body 10 between an inlet 11 and an outlet 12. The inlet 11 and the outlet 12 are formed in respective parts having at their inner ends within a chamber 13 of the body 10, respective orifices 14 and 15 between which can be inserted one end of an obturator member 16 which is pivotally mounted at its opposite end about the axis of the spindle 17 in the body 10. The central portion of the obturator member 16 provides an annular flat surface in the centre of which is mounted a permanent magnet 18. In the wall of the body 10 there is provided an adjuster screw 19, whereby the limit of pivotal movement in one direction of the member 16 can be adjusted, and furthermore, in the wall of the body 10 is an outlet 20 through which fuel, which is unable to pass from the inlet 11 to the outlet 12, can escape.

The body also contains an electro-magnetic device including a coil 21 within which is disposed a fixed core 22. Mounted in the centre of the core 22, and disposed adjacent to the permanent magnet 18 is a further permanent magnet 23, the adjacent ends of the permanent magnets 18 and 23 being of the same polarity so that these two permanent magnets tend to repel one another, thus moving the obturator member 16 in the direction away from the electro-magnetic device. Energisation of this device however, tends to attract annular surfaced portion of the obturator member 16 towards the core 22, the obturator member 16 thus acting as the armature for the electro-magnetic device.

In the absence of the permanent magnets 18 and 23, the magnetic force exerted upon the armature would vary inversely as the square of the distance between the armature and the core, and thus the movement of the obturator member 16 to vary the flow of fluid between the orifices 14 and 15 with respect to the current supplied to the coil 21 would vary substantially in the same proportion. The permanent magnets 18 and 23 however oppose this action and the tendency is for the obturator member 16 to move by an amount which is proportional to the current supplied to the coil 21.

It is to be understood that the device can be modified by the replacement of the obturator member 16 inserted between the two orifices 14 and 15, by a tubular part carried on or formed integrally with the obturator member 16 which is deflected from axial alignment with an orifice in the body, this orifice communicating with an outlet in the body.

Having thus described my invention what I claim as new and desire to secure by Letters Patent is:

1. An electrically operated fluid flow control device comprising a body, a deflectable member pivotally connected at one end to the body and carrying means at its other end arranged to interrupt a stream of fluid flowing through the body towards an outlet orifice in the body, an electro-magnetic device having an armature on the deflectable member to move it in one direction upon energisation of the electro-magnetic device, and a pair of co-axial permanent magnets on the member and on the body respectively, having like poles at their ends aligned with one another so as to oppose the action of the electro-magnetic device.

2. A device as claimed in claim 1 in which the means on said other end of the member is in the form of a obturator positioned adjacent to a pair of aligned openings in the body, the flow between the openings being controlled by the position of the obturator.

References Cited

UNITED STATES PATENTS

| 2,310,562 | 2/1943 | Whittington | 251—65 |
| 2,667,895 | 2/1954 | Pool et al. | 251—65 X |
| 2,962,593 | 11/1960 | Thomas | 251—65 X |
| 2,972,465 | 2/1961 | Ray | 251—65 X |
| 3,029,830 | 4/1962 | Klover et al. | 137—625.62 X |
| 3,212,751 | 10/1965 | Hassa | 251—65 |

M. CARY NELSON, Primary Examiner.

R. C. MILLER, Assistant Examiner.

U.S. Cl. X.R.

137—625.62; 251—129